(12) United States Patent
Sifferman et al.

(10) Patent No.: US 11,378,112 B2
(45) Date of Patent: Jul. 5, 2022

(54) BOLTED JOINT USING DEFORMABLE SLEEVE WITH LONGITUDINAL GROOVES

(71) Applicant: Acument Intellectual Properties, LLC, Sterling Heights, MI (US)

(72) Inventors: Gary Sifferman, Grand Blanc, MI (US); Paul Purdy, Holly, MI (US)

(73) Assignee: Acument Intellectual Properties, LLC, Sterling Heights, MI (US)

(*) Notice: Subject to any disclaimer, the term of this patent is extended or adjusted under 35 U.S.C. 154(b) by 239 days.

(21) Appl. No.: 16/817,303

(22) Filed: Mar. 12, 2020

(65) Prior Publication Data

US 2020/0291974 A1 Sep. 17, 2020

Related U.S. Application Data

(60) Provisional application No. 62/818,968, filed on Mar. 15, 2019.

(51) Int. Cl.
*F16B 33/00* (2006.01)
*F16B 5/02* (2006.01)

(52) U.S. Cl.
CPC ................ *F16B 5/0258* (2013.01)

(58) Field of Classification Search
CPC ............................................. F16B 5/0258
USPC .................... 411/367, 57.1, 58, 60.2
See application file for complete search history.

(56) References Cited

U.S. PATENT DOCUMENTS

| | | | |
|---|---|---|---|
| 1,996,128 A | 4/1935 | Thomson | |
| 2,853,112 A | 9/1958 | Poupitch | |
| 3,298,725 A | 1/1967 | Boteler | |
| 3,456,972 A | 7/1969 | Drotar | |
| 4,048,898 A | 9/1977 | Salter | |
| 4,236,562 A | 12/1980 | Molina | |
| 4,863,329 A * | 9/1989 | Wilson | F16B 9/056 411/383 |
| 5,645,282 A * | 7/1997 | Belter | F16J 15/061 411/510 |
| 6,247,883 B1 | 6/2001 | Monserratt | |
| 7,717,659 B2 | 5/2010 | Lang | |
| 8,770,902 B1 * | 7/2014 | Miller | F16B 5/0208 29/451 |
| 8,920,091 B2 * | 12/2014 | Heinrich | F16B 5/0275 411/389 |
| 10,574,018 B2 * | 2/2020 | Nguyen | B64D 45/02 |

(Continued)

*Primary Examiner* — Gary W Estremsky
(74) *Attorney, Agent, or Firm* — Quinn IP Law

(57) ABSTRACT

A bolted joint providing a "zero-clearance" fit formed from a bolt including a shoulder that works during installation to cold form a deformable sleeve. The bolted joint joins a bolt receiving member to a clamped component. One or more bolted joints may be used and as the bolts are installed, shoulders on each of the bolts dilate deformable sleeves until the outer diameters of the sleeves contact internal walls of through holes in the clamped component. Each of the deformable sleeves includes at least one groove or flute on its interior surface that results in: reduced radial load on internal walls of the clamped component and the bolt receiving members, and less friction between the sleeve and both the clamped component and a counter bore disposed within the bolt receiving member, thereby allowing for smaller percentage of the bolt's tensile strength capability required to deform the sleeve.

20 Claims, 5 Drawing Sheets

(56) References Cited

U.S. PATENT DOCUMENTS

| | | | |
|---|---|---|---|
| 2002/0159861 A1* | 10/2002 | Genick, II | F16B 41/002 |
| | | | 411/353 |
| 2007/0036635 A1* | 2/2007 | Lang | F16B 4/004 |
| | | | 411/539 |
| 2009/0028634 A1* | 1/2009 | Steinke | B64C 1/06 |
| | | | 403/337 |
| 2009/0324361 A1* | 12/2009 | Dolan | F16B 5/0258 |
| | | | 411/55 |
| 2011/0097176 A1* | 4/2011 | Ichishima | F16B 19/02 |
| | | | 411/546 |
| 2013/0125864 A1* | 5/2013 | Kannan | F02M 61/168 |
| | | | 123/469 |
| 2013/0322985 A1* | 12/2013 | Gasmen | F16B 5/02 |
| | | | 411/367 |
| 2019/0376548 A1* | 12/2019 | Matsumoto | F16B 25/00 |

* cited by examiner

Section 2c-2c

Section 3c-3c

BOLTED JOINT USING DEFORMABLE SLEEVE WITH LONGITUDINAL GROOVES

RELATED APPLICATION (PRIORITY CLAIM)

This application claims the benefit of U.S. Provisional Application Ser. No. 62/818,968, filed on Mar. 15, 2019, which is hereby incorporated herein by reference in its entirety.

BACKGROUND

The present application generally relates to bolted joints, and more specifically relates to a zero-clearance bolted joint such as for use in high shear load joints including a bolt receiving member and a clamped component. This solution may be used in any high shear load joint.

However, generally the bolted joints are not capable of keeping the clamped components from moving in relation to each other. This is because the bolts are not capable of producing enough friction to keep the joint from slipping, which in turn causes the bolts to back out of the joint.

As an example, one application in which bolted joints have been used is in joining a bolt receiving member to a clamped component. However, generally the bolted joints are not capable of keeping the bolt receiving member from moving in relation to the clamped component, and thus slippage of the clamped component can occur. One current method of joining a bolt receiving member to a clamped component utilizes matching circular patterns of a plurality of through holes on the clamped component and a plurality of tapped holes on the bolt receiving member. This design has raised concerns with the hole position tolerance capability of the manufacturing plants.

U.S. Pat. No. 7,717,659 discloses a bolted joint which is formed by using a bolt having a tapered shoulder to cold form a deformable sleeve in order to provide a "zero-clearance" fit. Specifically, as bolts are installed into the clamped component and the bolt receiving member, tapered shoulders on the bolts dilate deformable sleeves until the outer diameters of the sleeves contact internal walls of through holes in the clamped component. There is not always enough friction between the sleeves and internal walls of through holes in the clamped component to accommodate misalignment of the through holes in the clamped component and the bolt receiving member while maintaining a zero-clearance fit.

SUMMARY

An object of an embodiment of the present invention is to provide a zero-clearance bolted joint which can be used, for example, to join a high shear load joint.

Another object of an embodiment of the present invention is to provide a zero-clearance high shear load bolted joint which can be used as a way of fastening a first clamped component to a bolt receiving member that accommodates misalignment and minimizes clamped component slippage relative to the bolt receiving member while the joint is submitted to an applied service load.

Briefly, and in accordance with at least one of the foregoing objects, an embodiment of the invention provides a bolted joint which is formed by using a bolt having a shoulder to cold form a deformable sleeve in order to provide a "zero-clearance" fit. This bolted joint may be used in single or multiple hole applications to accommodate misalignments or hole position errors between joint components. The misalignment/hole position errors are a greater problem in joints with multiple bolt locations. Each of the deformable sleeves includes at least one groove or flute on a sleeve interior surface that results in less friction between both the bolt and the sleeve, which reduces the radial load necessary to deform the sleeve during the installation process and also reduces the axial load on the floor of the counter-bore of a bolt receiving member. The lower radial loads and axial loads to deform the deformable sleeve allow more options for clamped components and bolt receiving member materials and geometries such as associated wall thicknesses than conventional sleeves without the at least one longitudinal groove.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 2b is top view of the sleeve shown in FIG. 2a.

FIG. 3b is top view of the sleeve shown in FIG. 3a.

DESCRIPTION OF ILLUSTRATED EMBODIMENTS

Figure 1A:
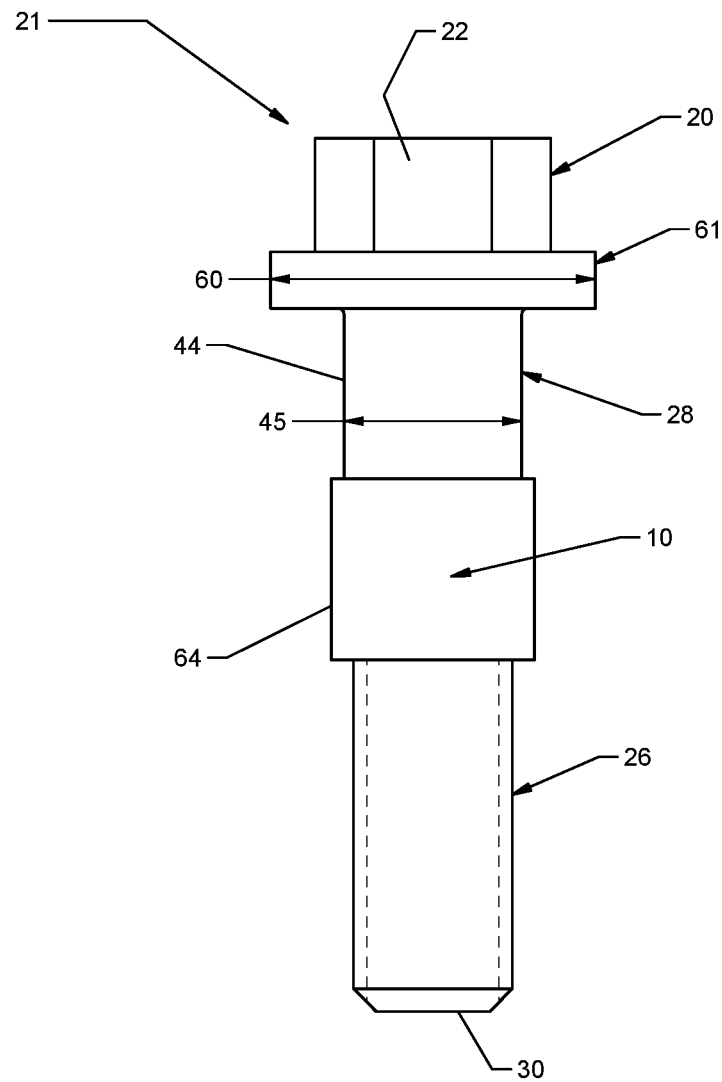
FIG. 1a is a side view showing a sleeve disposed on a bolt, before installation in accordance with an embodiment of the invention.

While the present invention may be susceptible to embodiment in different forms, there are shown in the drawings, and herein will be described in detail, embodiments thereof with the understanding that the present description is to be considered an exemplification of the principles of the invention and is not intended to limit the invention to that as illustrated and described herein.

The present invention is directed to a zero-clearance bolted joint which can be used, for example, as a way of fastening a high shear load joint including a first clamped component and a bolt receiving member that accommodates misalignment and minimizes clamp component slippage with respect to a bolt receiving member while the high shear load joint is submitted to an expected service load. A standard service load is an expected load that is applied to the bolted joint after installation during a service life of the bolted joint.

Figure 1B:
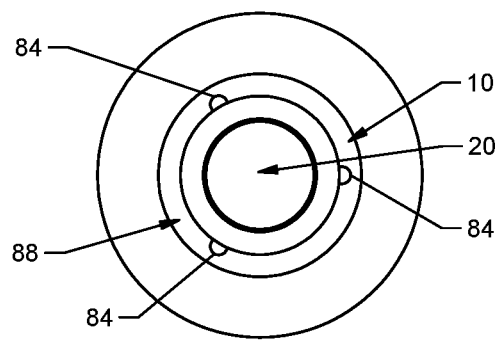
FIG. 1b is an end view showing a sleeve disposed on a bolt, before installation.
Figure 4:
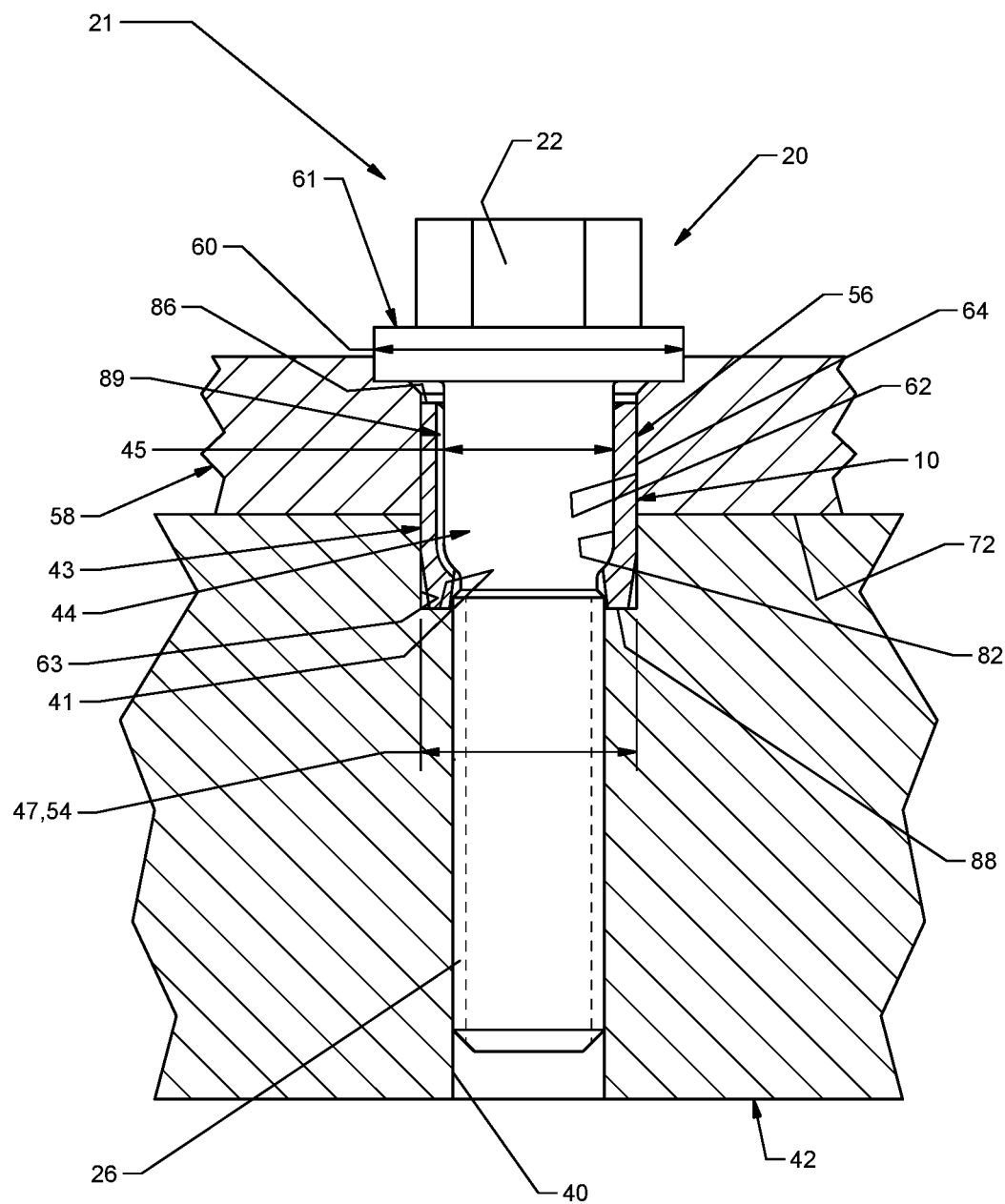
FIG. 4 shows the bolt and sleeve of FIG. 1, in the form of a bolted joint (i.e., after installation), in accordance with an embodiment of the present invention.

FIG. 1a is a side view showing a bolt and sleeve assembly 21 including a deformable sleeve 10 disposed on a bolt 20, before installation. FIG. 4 shows the sleeve 10 and bolt 20 of FIG. 1a, in the form of a bolted joint (i.e., after installation), in accordance with an embodiment of the invention. FIG. 1b is an end view of the sleeve 10 disposed on the bolt 20.

As shown in FIGS. 1a and 1b, the bolt 20 has a head 22 including a flange 61 with a diameter 60, wherein the head 22 has a drive feature and is not limited to the hex profile as shown in FIGS. 1a and 4. A shaft 28 of the bolt 20 has a shaft threaded portion 26 spaced longitudinally away from the head 22, proximate to an end 30 of the bolt 20 and a shaft non-threaded portion disposed between the head and the shaft threaded portion.

As shown in FIG. 1a, a shoulder 44 is formed on shaft non-threaded portion, wherein the shoulder 44 has a diameter 45 and is disposed generally between the threaded portion 26 and the head 22 of the bolt 20. As shown, the shoulder 44 on the bolt 20 is preferably provided as being rounded, although the shoulder 44 can have other profiles without departing from the scope of the present invention.

In addition to the bolt 20, the bolt and sleeve assembly 21 also includes a deformable sleeve 10 as shown in FIGS. 1a-2c, and 4 in accordance with an embodiment.

With regard to materials, the bolt 20 may be formed of, for example, ISO898-1, while the sleeve 10 may be formed of, for example, AISI 1010 steel. Regardless of the exact material of the bolt 20 and sleeve 10, preferably the sleeve 10 is made from a softer material than the bolt 20.

Figure 2A:
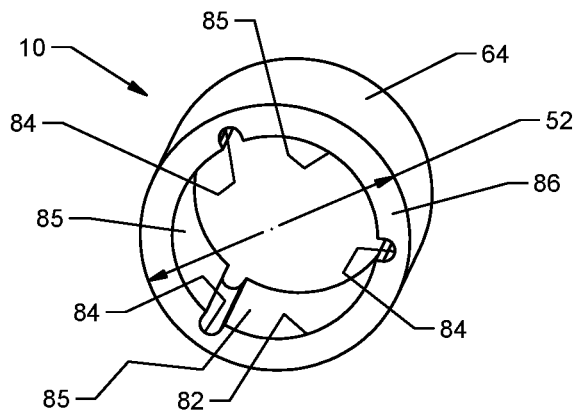
FIG. 2a is a perspective top view of a sleeve shown in FIG. 1 with axially deep, radially narrow grooves in accordance with an embodiment.
Figure 2B:
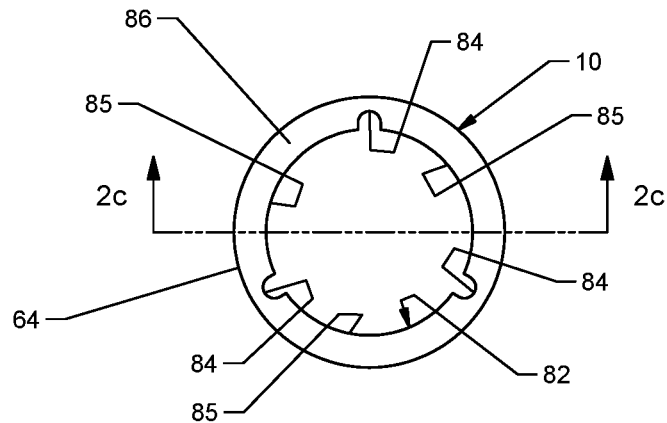
Figure 2C:
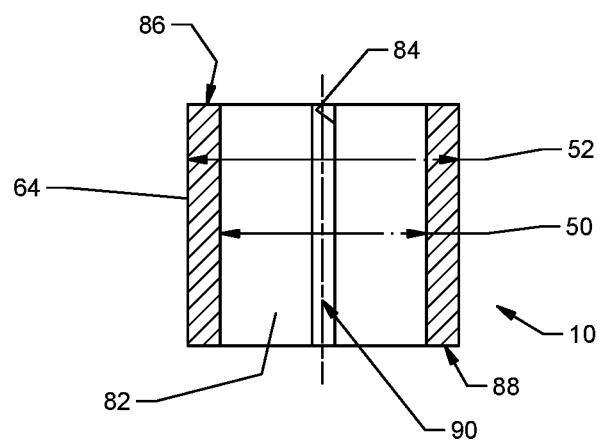
FIG. 2c is a side cross sectional view taken across line 2c-2c of the sleeve shown in FIG. 2b.

A preferred structure of the sleeve 10 will now be described in more detail. More particularly, FIG. 2a illustrates a top perspective view of the deformable sleeve 10 as shown in FIG. 1a-1b. FIG. 2b shows a top view of the sleeve 10 shown in FIG. 2a. FIG. 2c shows a cross-sectional view of the sleeve 10 shown in FIG. 2b taken across line 2c-2c.

As shown in more detail in FIG. 2c, the sleeve 10 has a sleeve inner diameter 50 and a sleeve outer diameter 52. As shown in FIGS. 2a-2c, preferably, the sleeve 10 has an outer surface 64 defining the sleeve outer diameter 52 and a though bore defining a sleeve interior surface 82 having the sleeve inner diameter 50, wherein the interior surface 82 of the sleeve includes one or more grooves or flutes 84 integrally formed with the sleeve interior surface 82. Preferably, each groove or flute 84 on the sleeve interior surface 82 runs longitudinally and extends along with the through bore, at least partially from a first sleeve end 86 to an opposite second sleeve end 88 (see FIGS. 2a-2c). Although the Figures show that each groove or flute 84 extends all the way from the first sleeve end 86 to the opposite second sleeve end 88, this is not imperative and is just one possible embodiment. The grooves or flutes 84 may, instead, only extend partially from the first sleeve end 86 to the opposite second sleeve end 88 while still staying very much within the scope of the present invention.

Preferably, if more than one groove or flute 84 is provided, they are generally parallel to each other. For example, as shown in FIGS. 2a-2b, three or more grooves or flutes 84 can be provided, each equally-spaced apart (i.e., generally 120 degrees away from each other relative to a longitudinal, central axis 90 (shown in FIG. 2c) of the sleeve 10).

Figure 3A:
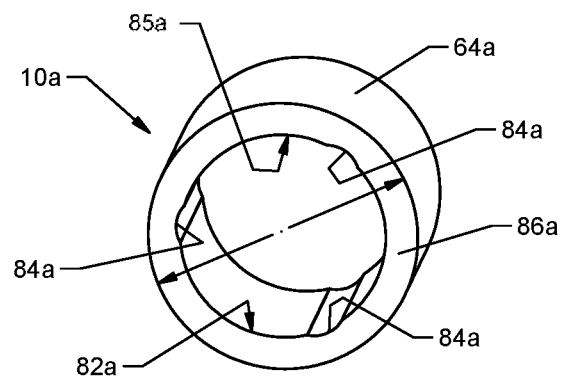
FIG. 3a is a perspective top view of a sleeve shown in FIG. 1 with axially narrow, radially shallow grooves in accordance with an embodiment.
Figure 3B:
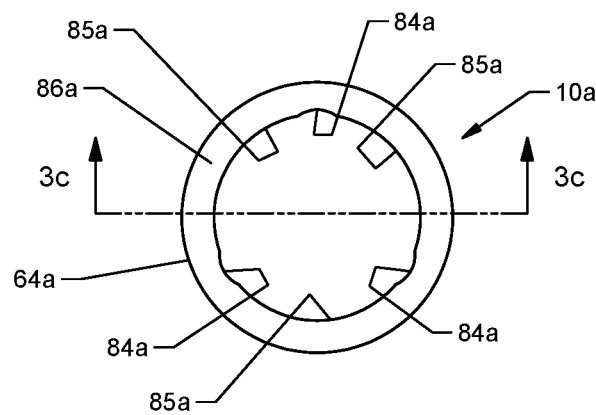
Figure 3C:
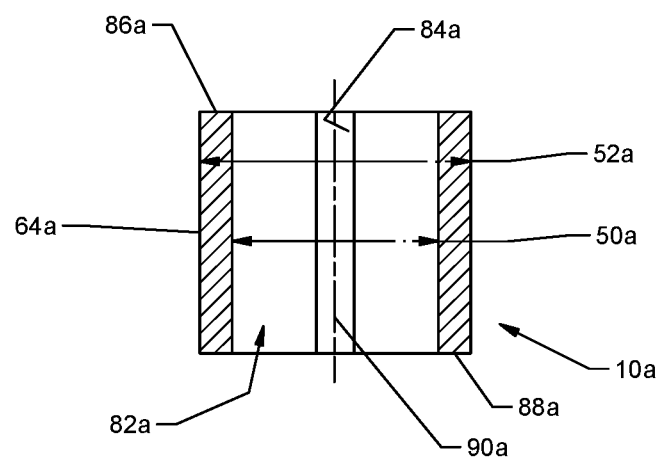
FIG. 3c is a side cross sectional view taken across line 3c-3c of the sleeve shown in FIG. 2b.

The grooves or flutes 84 can have varying geometries while still staying within the scope of the present invention. For example, each groove or flute 84 can be radially narrow but axially deep (as shown in FIGS. 1b, 2a-2c), or each groove or flute 84a can be radially wide but axially shallow (as shown in FIGS. 3a-3c). Any of these geometries may effectively form different embodiments of the invention. Regardless of the exact size and shape, preferably the grooves or flutes function to reduce friction without significantly compromising the strength of the sleeve. Furthermore, while it is preferred that each groove or flute be generally identical to each other, this is not imperative and in fact each can have a different profile (i.e., size and shape) while still staying within the scope of the invention.

With regard to FIGS. 3a-3c, the sleeve 10a is the same as sleeve 10 shown with reference to FIGS. 2a-2c, however, the grooves or flutes 84a are radially wide but axially shallow. Like reference numbers are referred to for like elements for the sleeve 10a as shown in FIGS. 3a-3c with a suffix "a" added for each of the like elements that are similar to the like elements shown in FIGS. 2a-2c.

More particularly, FIG. 3a illustrates a top perspective view of the sleeve 10a as shown in FIG. 1. FIG. 3b shows a top view of the sleeve 10a shown in FIG. 3a. FIG. 3c shows a cross-sectional view of the sleeve 10a shown in FIG. 3b taken across line 3c-3c.

FIG. 1a-1b shows the condition of the sleeve 10 before the bolt 20 is installed. FIG. 4 shows the installation of the sleeve 10 and the bolt 20 after installation.

In an embodiment, the bolt and sleeve assembly fastens a first clamped component and a bolt receiving member together to form a bolted joint when the deformable sleeve is positioned within the aperture of the first clamped component and within the counter bore of the bolt receiving member such that there is a zero clearance fit between the sleeve outer surface and both a clamped component aperture wall and a bolt receiving member counter bore wall.

More particularly, referring to the bolted joint in FIG. 4, FIG. 4 is a side cross-sectional view of the bolt and sleeve assembly installed to fasten the first clamped component 58 and the bolt receiving member 42 together and thus form a bolted joint. During installation of the bolt 20, the head 22 of the bolt 20 is rotated causing the threaded portion 26 of the bolt 20 to thread into a through hole, such as a tapped hole 40, that is provided in a bolt receiving member 42, as shown in FIG. 4. As the threaded portion 26 threads into the tapped hole 40, the shoulder 44 of the bolt 20 cold forms the sleeve 10, thereby causing the sleeve outer surface 64 to contactably engage an aperture wall 62 of the first clamped component 58 and a counter bore wall 63 of the counter bore 43 of the bolt receiving member 42, thereby providing a "zero-clearance" fit there between. Despite only one joint being shown in FIG. 4 as an example, to fully join or fasten the bolt receiving member 42 to the first clamped component 58, in another embodiment, a plurality of bolted joints may be used.

With regard to the clamped component 58, FIG. 4 shows a section of the first clamped component 58 having an upper face, illustrating the aperture 56 defining a through hole within the first clamped component having an aperture diameter. With regard to the bolt receiving member 42 having the counter bore 43 having a counter bore wall 63 and bottom surface 41 provided therein.

Additionally, as shown in FIG. 4, the bolt receiving member counter bore 43 has a counter bore diameter 47 which effectively coincides with the corresponding aperture 56 in the clamped component 58, such that the tapped hole 40 begins at a point which is spaced away from the shear plane 72, which is the plane of contact between the bolt receiving member 42 and the clamped component 58. In an embodiment, the aperture diameter 54 of the first clamped component 58 is the same as the counter bore diameter 47 of the bolt receiving member 42. In an embodiment of the invention shown in FIG. 4, the bolt and sleeve assembly 21 is deformed into a receiving structure defined as the first clamped component 58 and the bolt receiving member 42.

Figure 5:
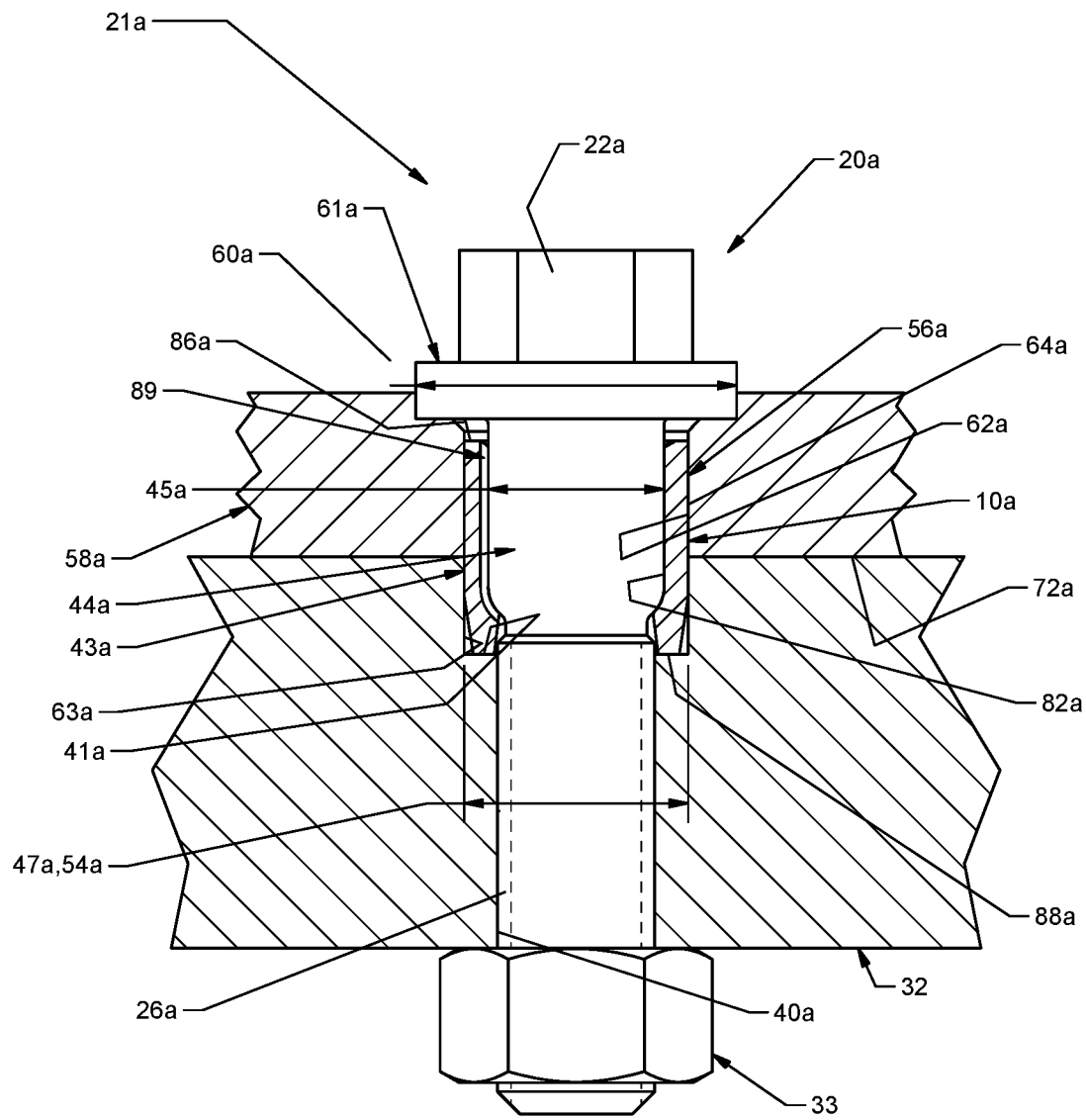
FIG. 5 shows an alternative embodiment of the present invention that is very similar to that which is shown in FIG. 4, but where the threaded portion of the bolt extends through a clearance hole (i.e, a non-threaded bore) in the bolt receiving member and engages a threaded nut.

An alternative embodiment is shown in FIG. 5. The embodiment shown in FIG. 5 is very similar to that which is shown in FIG. 4. As such, like reference numerals are used to identify like parts. The only difference between the embodiment shown in FIG. 5 and the embodiment shown in FIG. 4, and described previously, is that the embodiment shown in FIG. 5 provides that the through hole of the bolt receiving member is a clearance hole 40a (i.e., a non-threaded bore), as opposed to being a tapped hole 40, such as is shown in FIG. 4. In the embodiment shown in FIG. 5, the threaded portion of the bolt extends all the way through the clearance hole 40a in the bolt receiving member and is in threaded engagement with a threaded nut. In the embodiment shown in FIG. 5, the bolt receiving member is effectively a second clamped member, and is identified with reference numeral 32.

Regardless of the embodiment, preferably the grooves or flutes 84 are shaped and sized in accordance with the specific application, i.e., to obtain a desired level of friction between the sleeve and the bolt shoulder, and to have a desired surface area of the surfaces 85 in between the grooves or flutes 84 in light of the load required to deform the sleeve 10 into the receiving structure.

Preferably, before installation, the inner diameter 50 of the sleeve 10 (see FIG. 2c) is less than the outer diameter 45 of the shoulder 44 (see FIGS. 1a and 4), such that the shoulder 44 of the bolt 20 deforms the sleeve 10 when the bolt 20 is installed, i.e., relative to the bolt receiving member 42. Preferably, the sleeve outer diameter 52 of the sleeve 10 (see FIG. 2c) is smaller than both a aperture diameter 54 (see FIG. 4) of the corresponding aperture 56 of the clamped component 58 and the counter borer diameter 47 of the bolt receiving member counter bore 43 of the bolt receiving member 42, such that the sleeve 10 can be inserted in the clamped component aperture 56 in the clamped component 58 and the bolt receiving member counter bore 43. Additionally, preferably a diameter 60 (see FIGS. 1a and 4) of the head portion 22 of the bolt 20 is larger than the inner diameter 54 of the clamped component through hole 56 in the clamped component 58. As such, when installed, the head 22 of the bolt 20 seats against an upper face of the clamped component 58, as shown in FIG. 4.

Additionally, the groove 84 also provides a void 89 (see FIG. 4) for displaced material during deformation of sleeve 10 during installation. As a result, the present embodiment allows for reduced radial load on both the aperture wall 62 of clamped component 58 and counter bore wall 63 of bolt receiving member 42 and reduced axial load upon bottom surface 41 of counter-bore 43 of bolt receiving member 42 (shown in FIG. 4). The reduced radial and axial loads allows for lower strength materials to be used in the clamped component and the bolt receiving member than would be used in a bolted joint having a sleeve without grooves.

The grooves or flutes 84 on the interior surface 82 of the sleeve 10 (shown in FIGS. 2a-2c) create less contact area than a sleeve without grooves 84 formed therein resulting in less friction between the shoulder 44 of the bolt 20 and the sleeve 10 during installation than the larger contact area with a higher level of friction between a the shoulder of a conventional bolt and a conventional sleeve without grooves. Thus, the grooves 84 formed on the interior surface 82 of the sleeve 10 allows for a desired level friction to be achieved, i.e., less friction between the interior surface 82 of the sleeve 10 and the bolt shoulder 44 when a load is applied to the bolt that is sufficient to deform the sleeve 10 into the clamped component aperture 56 and the bolt receiving member counter bore 43 during installation.

The reduced friction between both the bolt and the sleeve also reduces a tensile load applied to the bolt needed to deform the sleeve with the grooves than is required to deform a conventional sleeve without grooves during an installation process to provide zero-clearance between the sleeve and both the clamped component aperture wall and the bolt receiving member counter bore wall.

The reduced friction between the sleeve 10 and the bolt shoulder 44 also results ins less axial load applied to the sleeve 10 pressing against the bottom surface 41 of counter-bore 43 of the bolt receiving member 42 than the axial load applied to a conventional sleeve without grooves. Also, a smaller percentage of the bolt's tensile strength capability is required to deform the sleeve 10 during installation. The smaller percentage of the bolt's tensile strength capability required to deform the sleeve allows for manufacturing of smaller bolt sizes, such as less than an M8 bolt, than was possible with a bolt and sleeve assembly having a conventional sleeve without grooves. Therefore, more of the bolt's strength is available to apply a service load to the clamped component.

In an embodiment, the bolted joint accommodates misalignment between the clamped component aperture 56 and the bolt receiving member counter bore 43 while maintaining zero clearance between the sleeve 10 and both the clamped portion aperture wall 62 and the counter-bore wall 63.

In an embodiment of the invention, the bolted joint is a high shear load joint that minimizes slippage of the clamped component 58 with respect to the bolt receiving member 42 when the high shear load joint is submitted to a standard service load, While specific embodiments of the invention have been shown and described, it is envisioned that those skilled in the art may devise various modifications without departing from the spirit and scope of the present invention.

What is claimed is:

1. A zero-clearance bolted joint that includes a clamped component and a bolt receiving member that are fastened together with a bolt and sleeve assembly, said bolted joint comprising:
   a clamped component having an upper face and an aperture provided there through having an aperture diameter, said aperture defining a clamped component aperture wall;
   a bolt receiving member having
      a counter bore having a counter bore diameter equal to the aperture diameter, said counter bore defining a counter bore wall and counter bore bottom surface, and
      a through hole coaxial and concentric with the counter bore, said counter bore being aligned with said aperture of said clamped component; and
   a bolt and sleeve assembly including
      a bolt having
         a head having a width which is larger than said width of said aperture diameter, said head being in abutting engagement with said upper face of said clamped component, and
         a shaft extending from said head, said shaft having a shaft threaded portion spaced longitudinally away from the head, said threaded portion extending into said through hole of said bolt receiving member, and a shaft non-threaded portion which is disposed between said head and said shaft threaded portion, and a shoulder formed on the shaft non-threaded portion;

a sleeve having a sleeve outer surface defining an outer sleeve diameter, and a sleeve interior surface that contacts the shoulder, said sleeve having a sleeve first end, a sleeve second end opposite the sleeve first end, a sleeve through bore defining the sleeve interior surface having an inner sleeve diameter, wherein the sleeve interior surface contacts the shoulder, at least one longitudinal groove integrally formed in the sleeve interior surface, wherein said at least one longitudinal groove extends at least partially between the sleeve first end and sleeve second end, said bolt and sleeve assembly fastens the clamped component and the bolt receiving member together to form the bolted joint when the sleeve is positioned within said aperture of said clamped component and within the counter-bore of said bolt receiving member such that there is a zero clearance fit between the sleeve outer surface and both the clamped component aperture wall and the bolt receiving member counter bore wall.

2. The bolted joint of claim 1, wherein said sleeve second end abuttingly engages said bottom surface of said bolt receiving member counter bore.

3. The bolted joint of claim 1, wherein said sleeve first end contacts said shoulder and wherein said sleeve second end contacts said bolt threaded portion.

4. The bolted joint of claim 1, wherein the outer sleeve diameter is smaller than both the clamped component aperture diameter and the bolt receiving member counter bore diameter, thereby allowing insertion of the sleeve into both the clamped component aperture and the bolt receiving member counter bore.

5. The bolted joint of claim 1, wherein the at least one longitudinal groove formed on the sleeve interior surface provides less of a contact area and thus, a reduced level of friction during installation between the bolt shoulder and the sleeve interior surface than a larger contact area with a higher level of friction between a conventional bolt shoulder and a conventional sleeve without the at least one longitudinal groove.

6. The bolted joint of claim 5, wherein the less contact area contact area allows for a desired level friction to be achieved between the interior surface of the sleeve and the bolt shoulder when a load is applied to the bolt that is sufficient to deform the sleeve into the clamped component aperture and the bolt receiving member counter bore during installation.

7. The bolted joint of claim 5, wherein the reduced level of friction between both the bolt and the sleeve interior surface also reduces a tensile load applied to the bolt needed to deform the sleeve than is required to deform a conventional sleeve without grooves during an installation process to provide zero-clearance between the sleeve outer surface and both the clamped component aperture wall and the bolt receiving member counter bore wall.

8. The bolted joint of claim 5, wherein the reduced level of friction between the sleeve interior surface and the bolt shoulder during installation further results in less axial load applied to the sleeve pressing against the counter bore bottom surface of the bolt receiving member than an axial load applied to a conventional sleeve without the at least one longitudinal groove.

9. The bolted joint of claim 1, wherein the bolted joint accommodates misalignment between the clamped component aperture and the bolt receiving member counter bore while maintaining zero clearance between the sleeve and both the clamped portion aperture wall and the counter-bore wall.

10. The bolted joint of claim 9, wherein slippage of the clamped component with respect to the bolt receiving member is minimized when the bolted joint is submitted to a service load, wherein a service load is an expected load that is applied to the bolted joint after installation during a service life of the bolted joint.

11. The bolted joint of claim 1, wherein the at least one groove comprises:

a void for displaced material during deformation of sleeve during an installation process.

12. The bolted joint of claim 1, wherein a radial load exerted on clamped component aperture wall and bolt receiving member counter bore wall in the bolted joint having the sleeve with at least one longitudinal groove is less than a radial load exerted in a bolted joint having a sleeve without the at least one longitudinal groove.

13. The bolted joint of claim 12, wherein a reduced radial load results in less level of friction between the sleeve and both the clamped component and the bolt receiving member counter bore than a level of friction that in a bolted joint that has a conventional sleeve without at least one longitudinal groove.

14. The bolted joint of claim 12, wherein during installation of the bolt and sleeve assembly in the clamped component and the bolt receiving member to form the bolted joint, a smaller percentage of a bolt's tensile strength capability is required to deform the sleeve than is required to install a conventional bolt-sleeve assembly with a sleeve that does not have at least one longitudinal groove.

15. The bolted joint of claim 14, wherein the smaller percentage of the bolt's tensile strength capability required to deform the sleeve allows for manufacturing of bolt sizes smaller than an M8 bolt.

16. The bolted joint of claim 1, including more than one groove spaced in a longitudinally parallel arrangement on the interior surface of the sleeve.

17. The bolted joint of claim 16, wherein the deformable sleeve further comprises:

a plurality of grooves, equally spaced apart from each other relative to a longitudinal central axis of the sleeve.

18. The bolted joint of claim 1, wherein the at least one longitudinal groove is radially narrow and axially deep.

19. The bolted joint of claim 1, wherein the at least one longitudinal groove is radially wide and axially shallow.

20. The bolted joint of claim 1, wherein either: 1. the through hole of the bolt receiving member is threaded and the threaded portion of the bolt is in threaded engagement with the through hole of the bolt receiving member; or 2. the through hole of the bolt receiving member is non-threaded, and the threaded portion of the bolt extends through the through hole and is in threaded engagement with a threaded nut.

* * * * *